United States Patent
Naito et al.

(10) Patent No.: US 7,814,952 B2
(45) Date of Patent: Oct. 19, 2010

(54) RUN-FLAT SUPPORT BODY AND TIRE/WHEEL ASSEMBLY

(75) Inventors: Mitsuru Naito, Hiratsuka (JP); Takumi Sekiguchi, Hiratsuka (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 833 days.

(21) Appl. No.: 11/587,747

(22) PCT Filed: May 9, 2005

(86) PCT No.: PCT/JP2005/008424

§ 371 (c)(1),
(2), (4) Date: Oct. 27, 2006

(87) PCT Pub. No.: WO2005/108124

PCT Pub. Date: Nov. 17, 2005

(65) Prior Publication Data

US 2008/0060736 A1    Mar. 13, 2008

(30) Foreign Application Priority Data

May 7, 2004    (JP) .............................. 2004-138465

(51) Int. Cl.
*B60C 17/00* (2006.01)
*B60C 17/04* (2006.01)

(52) U.S. Cl. ......................... 152/516; 152/152; 152/520

(58) Field of Classification Search .................. 152/152, 152/516, 520
See application file for complete search history.

(56) References Cited

U.S. PATENT DOCUMENTS

| 6,843,288 | B2 * | 1/2005 | Seko et al. | .................. 152/156 |
| 7,287,566 | B2 * | 10/2007 | Naito et al. | .................. 152/516 |

FOREIGN PATENT DOCUMENTS

| JP | 10-297226 | 11/1998 |
| JP | 2001-519279 | 10/2001 |
| JP | 2004-051011 | 2/2004 |
| JP | 2004-051088 | 2/2004 |
| JP | 2004-148928 | 5/2004 |
| WO | WO 99/19158 | 4/1999 |

* cited by examiner

*Primary Examiner*—Justin Fischer
(74) *Attorney, Agent, or Firm*—Greer, Burns & Crain, Ltd.

(57) ABSTRACT

The present invention provides a run-flat support body and a tire/wheel assembly whose weights can be respectively reduced. The run-flat support body includes an annular shell and elastic rings, the annular shell having an outer peripheral side as a support surface and an inner peripheral side formed in fork-shaped open legs, the elastic rings being attached respectively to the legs portions of the annular shell, and the elastic rings being designed to be mounted on a rim of a wheel. The annular shell is formed of a porous structural material having fine voids. The run-flat support body is attached to an inside of a pneumatic tire mounted on the rim of the wheel.

11 Claims, 3 Drawing Sheets

RUN-FLAT SUPPORT BODY AND TIRE/WHEEL ASSEMBLY

TECHNICAL FIELD

The present invention relates to a run-flat support body and a tire/wheel assembly, and more specifically, to a run-flat support body and a tire/wheel assembly, of which weights are respectively reduced.

BACKGROUND ART

As measures which enable a vehicle to make emergency running to a repair shop such as a gas station when a pneumatic tire is punctured while the vehicle is running, there are a case of causing a tire to have a special structure so as to embed highly rigid rubber into sidewall portions of the pneumatic tire, and a case of causing a tire/wheel assembly to have a special structure so as to insert a core (run-flat support body) into a cavity portion of the pneumatic tire mounted on a rim of a wheel while keeping the conventional tire structure. Out of the two cases, the latter mode proposal (for example, refer to Patent Documents 1 and 2) is on a tire/wheel assembly. In the case of this tire/wheel assembly, a run-flat support body is composed of an annular shell whose cross-section in the width direction of the tire bifurcates and has right and left leg portions. The two leg portions of the annular shell are mounted on rim seats respectively with an elastic ring attached to each of the two leg portions. Thereby, the run-flat support body supports the inner peripheral surface of the tire.

The above-described run-flat support body has an advantage that conventional wheel/rim constructions can be used as they are without any substantial modification made thereto. However, weight of the annular shell is heavy since the annular shell is usually formed of a metal material, causing a deterioration of a fuel consumption rate when the vehicle makes normal running.

[Patent Document 1] Japanese patent application Kokai publication No. Hei 10-297226

[Patent Document 2] Japanese patent application Kokai publication No. 2001-519279

DISCLOSURE OF THE INVENTION

An object of the present invention is to provide a run-flat support body and a tire/wheel assembly, which solve the above-described conventional problem, and enable weights thereof to be reduced.

To achieve the above-described object, the present invention provides the run-flat support body including an annular shell and elastic rings. The annular shell has an outer peripheral side as a support surface and an inner peripheral side formed in fork-shaped open legs. The elastic rings are attached respectively to the open leg portions. And the elastic rings are designed to be mounted on the rim of the wheel. The run-flat support body is characterized in that the annular shell is formed of a porous structural material having fine voids. Moreover, the tire/wheel assembly of the present invention is characterized in that the above-described run-flat support body is attached to an inside of a pneumatic tire mounted on a rim of a wheel.

In the run-flat support body of the present invention, the annular shell is formed of the porous structural material having the fine voids. Accordingly, weight of the annular shell is reduced, thus making it possible to reduce the weight of the run-flat support body, and to reduce fuel consumption. Moreover, in the tire/wheel assembly having the run-flat support body attached thereto, the voids of the porous structural material absorb a cavity resonance noise generated in the tire when the vehicle runs, and accordingly, tire noise can be reduced.

It is preferable that a porosity of the porous structural material be large on an outer peripheral surface side of the annular shell, and small on an inner peripheral surface side thereof, or that the annular shell be formed by laminating a plurality of the porous structural materials of which porosities are different from one another. Thus, impregnation of a lubricant into the voids of the porous structural material is facilitated.

It is preferable that a thickness of the annular shell be thinned in a portion of convex curved surfaces on the outer peripheral side, and thickened in the both leg portions on the inner peripheral side. Whereby, a stress applied to the annular shell is appropriately dispersed, thus making it possible to ensure durability of the run-flat support body while reducing usage of the porous structural material to the minimum, and to achieve a further weight reduction thereof.

Moreover, a thickness of the annular shell may be substantially even, and in this case, it is preferable that the porosity of the porous structural material be large in portions of convex curved surfaces on the outer periphery side, and small in the both leg portions on the inner periphery side. Whereby, the stress applied to the annular shell is dispersed appropriately, thus making it possible to ensure the durability of the run-flat support body while reducing the usage of the porous structural material to the minimum, and to achieve a further weight reduction thereof.

It is preferable that the porous structural material be a sintered material made of a metal, a metal oxide, or an inorganic compound. By using the sintered material as described above, the porous structural material having appropriate voids can be easily fabricated.

It is preferable that a lubricant be impregnated into the voids of the porous structural material. Whereby, a space between an inner surface of the pneumatic tire and the outer peripheral surface of the annular shell is lubricated when the tire is punctured, thus making it possible to extend a run-flat running distance by preventing a breakage of the tire.

BEST MODES FOR CARRYING OUT THE INVENTION

A description will be made below in detail of a configuration of the present invention while referring to the accompanying drawings.

Figure 1:
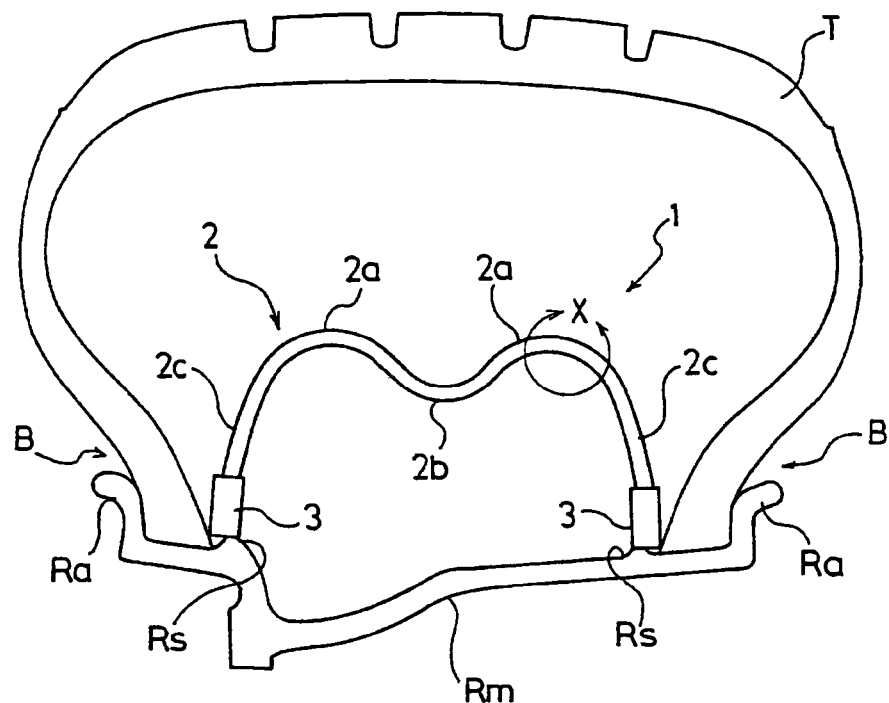
FIG. 1 is a cross-sectional view showing an example of main portions of a tire/wheel assembly into which a run-flat support body according to an embodiment of the present invention is attached.
Figure 2:
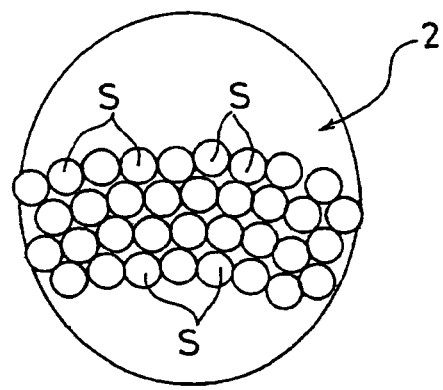
FIG. 2 is a cross-sectional view showing an enlarged X portion of FIG. 1.

FIG. 1 is a cross-sectional view illustrating main portions of a tire/wheel assembly into which a run-flat support body according to an embodiment of the present invention is attached, and FIG. 2 is a cross-sectional view showing an enlarged X portion of FIG. 1.

In FIG. 1, the tire/wheel assembly (wheel) is composed in such a manner that a pneumatic tire T attaches bead portions B and B thereof onto a rim Rm of a wheel. A run-flat support body 1 is inserted into an inside of the pneumatic tire T. The run-flat support body 1 is composed of an annular shell 2, and elastic rings 3 and 3 attached onto both right and left leg portions of the annular shell 2.

As shown in FIG. 2, the annular shell 2 is made of a porous structural material on which metal particles S are sintered, and is formed of an annular member, which has right and left two convex curved surfaces 2a on an outer peripheral side thereof on a lateral cross section of the tire in a width direction, and which makes an inner peripheral side thereof formed in fork-shaped open legs. The elastic rings 3 and 3 are respectively attached onto the both fork-shaped open leg portions 2c and 2c. The annular shell 2 is supported on the rim Rm of the wheel while interposing the elastic rings 3 and 3 therebetween, and sandwiches the bead portions B and B of the pneumatic tire T, respectively, between rim flanges Ra and Ra. There are right and left two convex curved surfaces 2a to the outer peripheral side in the illustrated example; however, the number thereof may be one, or alternatively three or more, and is not particularly limited.

The run-flat support body 1 with the above-described configuration is spaced from an inner wall surface of the pneumatic tire T when a vehicle makes normal running with no tire punctured; however, the run-flat support body is adapted to support the punctured pneumatic tire T from the inside thereof when the vehicle makes run-flat running because the tire is punctured.

In the present invention, the annular shell 2 is composed of the porous structural material having a large number of fine voids. A type of the porous structural material is not particularly limited. However, it is preferable that the porous structural material is a sintered material such as sintered metal and ceramics and the like, which is formed by sintering particles made of a metal, a metal oxide or an inorganic compound. By using a sintered material as described above, a porous structural body having appropriate voids can be fabricated easily.

As described above, the annular shell 2 is formed of the porous structural material having the large number of voids, thus making it possible to reduce weight of the run-flat support body 1. Moreover, when the vehicle makes no run-flat running, the voids of the porous structural material absorb a cavity resonance noise generated in the pneumatic tire T, and accordingly, tire noise can be reduced.

The elastic rings 3 play a role to stably support the run-flat support body 1 by preventing a slip thereof with respect to rim seats Rs, as well as absorb impacts and vibrations, which are applied from the punctured pneumatic tire T to the annular shells 2.

Preferably, a constituent material of the elastic rings 3 is at least one selected from rubber, resin, and a composite material of these, more preferably, is the rubber. What can be preferably provided as the rubber is: natural rubber (NR); isoprene rubber (IR); styrene-butadiene rubber (SBR); butadiene rubber (BR); hydrogenated NBR; hydrogenated SBR; ethylene-propylene rubber (EPR, EPDM); butyl rubber (IIR); acrylic rubber (ACM); chloroprene rubber (CR); silicone rubber; fluorine rubber; and the like. Moreover, additives such as a filler, a vulcanizing agent, a vulcanization accelerator, a softener, and an antioxidant, and the like, can be appropriately added to these rubbers.

In the present invention, though the run-flat support body 1 may be attached onto the inside of the pneumatic tire T while keeping a state thereof, it is preferable that a lubricant be impregnated into the voids of the porous structural material forming the annular shell 2 in advance before the run-flat support body 1 is attached onto the inside of the tire. Whereby, a space between an inner surface of the pneumatic tire T and an outer peripheral surface of the annular shell 2 is lubricated when the tire is punctured, thus making it possible to extend a run-flat running distance by preventing a breakage of the tire. When the lubricant is impregnated in advance onto the outer peripheral surface of the annular shell 2 as described above, it is desirable that the voids of the porous structural material be at least exposed to the outer peripheral surface side of the annular shell 2.

Figure 3:
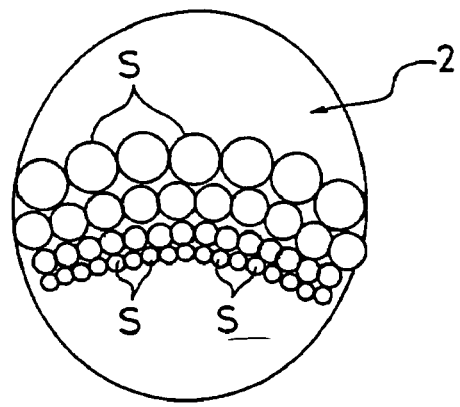
FIG. 3 is a cross-sectional view according to another embodiment of the present invention, which is equivalent to FIG. 2.

FIG. 3 shows a structure of an annular shell 2 according to another embodiment of the present invention. In this embodiment, preferably, a porosity of the annular shell 2 in the thickness direction is large on the outer peripheral surface side thereof, and small on the inner peripheral surface side thereof. With such a configuration, the impregnation of the lubricant into the voids of the porous structural material is facilitated, and in addition, it prevents the lubricant once impregnated from moving out of the voids. Note that, in the present mode, it is more preferable that the porosity of the annular shell 2 be gradually reduced from the outer peripheral surface side to the inner peripheral surface side in the thickness direction of the annular shell 2.

In the present invention, adjusting a size of the particles of the material that composes the porous structural material and a sintering temperature thereof can perform adjustment of the porosity in the porous structural material.

Figure 4:
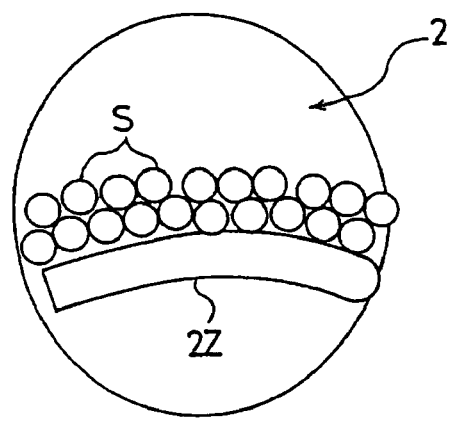
FIG. 4 is a cross-sectional view according to still another embodiment of the present invention, which is equivalent to FIG. 2.

FIG. 4 shows a structure of an annular shell 2 according to still another embodiment of the present invention. This embodiment indicates the case where the annular shell 2 is formed of a laminated structure of plural layers (two layers in FIG. 4) of which porosities are different from each other. FIG. 4 illustrates the case where the porosity of a layer 2z on the inner peripheral surface side is approximately zero. In this embodiment, the number of layers may be further increased, and the porosities in the respective layers may be gradually reduced from the outer peripheral surface side toward the inner peripheral surface side.

Figure 5:
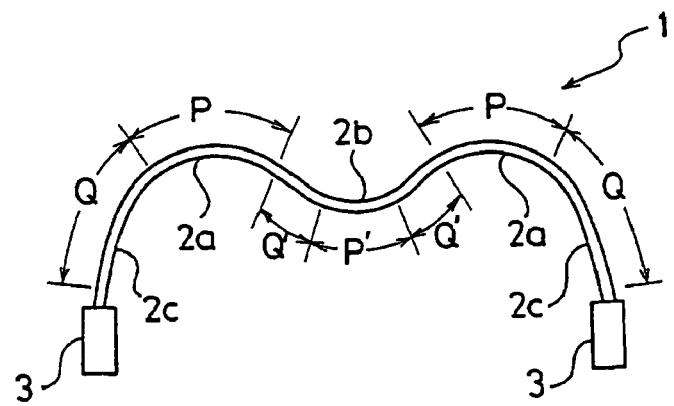
FIG. 5 is a cross-sectional view showing a shape of the run-flat support body according to the embodiment of the present invention.

The above-described example illustrates the case where the porosity of the annular shell 2 in the thickness direction is changed; however, the porosity may also be changed in a width direction on a lateral cross section thereof. Specifically, as shown in FIG. 5, a construction may also be adopted, in which the thickness of the annular shell 2 is made substantially the same across the overall width thereof, and the porosity in the width direction is large in portions (regions P in FIG. 5) of the convex curved surfaces 2a on the outer peripheral side, and is small in portions (regions Q in FIG. 5) of the both leg portions on the inner peripheral side. Specifically, a constitution of the porous structural material is densified in the regions Q to which a large bending load is applied, and a constitution thereof is loosened in the regions P to which a bending load smaller than that applied to the region Q is applied. With such a construction, a stress applied to the annular shell 2 is dispersed appropriately, thus making it possible to ensure durability of the run-flat support body 1 while reducing usage of the porous structural material to the minimum, and thus to achieve a further weight reduction thereof.

In this embodiment, it is more preferable that the porosity be large in a portion (region P' in FIG. 5) of a concave curved surface 2b which occupies a center region of the annular shell 2 in the width direction as in the above-described regions P, and that the porosity be small in portions (regions Q' in FIG. 5) which respectively couple the convex curved surfaces 2a and the concave curved surface 2b to one another as in the above-described regions Q.

Figure 6:
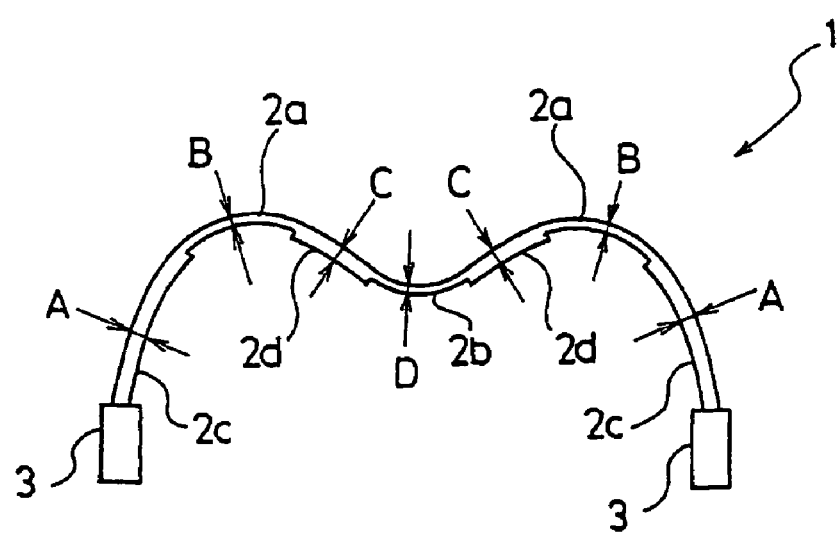
FIG. 6 is a cross-sectional view showing a shape of the run-flat support body according to another embodiment of the present invention.

Moreover, as shown in FIG. 6, the porosity of the annular shell 2 in the width direction may be substantially equivalent entirely, and the thickness of the annular shell 2 may be thinned in the convex curved surfaces 2a on the outer peripheral side of the annular shell 2, and thickened in the both leg portions 2c on the inner peripheral side. In this case, it is more preferable that a thickness of the portion which occupies the center region of the annular shell 2 in the width direction be thinned in the concave curved surfaces 2b, and thickened in portions 2d which respectively couple the convex curved surfaces 2a and the concave curved surface 2b to one another. Specifically, it is preferable that thicknesses A and C in the respective portions 2c and 2d, to which the large bending load is applied, be thickened, and that thicknesses B and D in the respective portions of the convex curved surfaces 2a and the concave curved surface 2b, to which the smaller bending load is applied, be thinned. Whereby, the stress applied to the annular shell 2 is dispersed appropriately, thus making it possible to ensure the durability of the run-flat support body 1 while reducing the usage of the porous structural material to the minimum, and to achieve the weight reduction thereof efficiently.

What is claimed is:

1. A run-flat support body comprising:
   an annular shell having an outer peripheral side as a support surface and an inner peripheral side formed in fork-shaped open legs; and
   elastic rings attached respectively to the open leg portions of the annular shell, with the elastic rings being designed to be mounted on a rim of a wheel,
   wherein the annular shell is formed of a porous structural material having fine voids, and
   further wherein a porosity of the porous structural material changes in a thickness direction of the annular shell such that the porosity is higher on an outer peripheral surface in a given region as compared to the porosity on an inner peripheral surface in the same given region.

2. The run-flat support body according to claim 1, wherein the porous structural material is a sintered material made of a metal, a metal oxide, or an inorganic compound.

3. A run-flat support body comprising:
   an annular shell having an outer peripheral side as a support surface and an inner peripheral side formed in a fork-shaped open legs; and
   elastic rings attached respectively to the open leg portions of the annular shell, with elastic rings being designed to be mounted on a rim of a wheel,
   wherein the annular shell is formed of a porous structural material having fine voids, and
   further wherein the annular shell comprises a laminated structure that includes a plurality of the porous structural materials of which porosities are different from one another.

4. A run-flat support body comprising:
   an annular shell having an outer peripheral side as a support surface and an inner peripheral side formed in a fork-shaped open legs; and
   elastic rings attached respectively to the open leg portions of the annular shell, with the elastic rings being designed to be mounted on a rim of a wheel,
   wherein the annular shell is formed of a porous structural material having fine voids,
   wherein a porosity of the porous structural material changes in the thickness direction of the annular shell such that the porosity is higher on an outer peripheral surface in a given region as compared to the porosity on an inner peripheral surface in the same region, and
   further wherein a lubricant is impregnated into the voids of the porous structural material.

5. A tire/wheel assembly comprising:
   a wheel including a rim;
   a pneumatic tire mounted on said rim; and
   a run-flat support body positioned within said pneumatic tire,
   wherein said run-flat support body includes:
     an annular shell having an outer peripheral side as a support surface and an inner peripheral side formed in fork-shaped open legs; and
     elastic rings attached respectively to the open leg portions of the annular shell, with the elastic rings being mounted on said rim of said wheel,
     wherein the annular shell is formed of a porous structural material having fine voids, and
     further wherein a porosity of the porous structural material changes in a thickness direction of the annular shell such that the porosity is higher on an outer peripheral surface in a given region as compared to the porosity on an inner peripheral surface in the same given region.

6. A run-flat support body comprising:
   an annular shell having an outer peripheral side as a support surface and an inner peripheral side formed in fork-shaped open legs; and
   elastic rings attached respectively to the open leg portions of the annular shell, and the elastic rings being designed to be mounted on a rim of a wheel,
   wherein the annular shell is formed of a porous structural material having fine voids, and
   further wherein the porous structural material is a sintered material made of a metal, a metal oxide, or an inorganic compound.

7. The run-flat support body according to claim 6, wherein the annular shell is formed by laminating a plurality of the porous structural materials of which porosities are different from one another.

8. The run-flat support body according to claim 6, wherein said annular shell includes a pair of convex curved surface portions on the outer peripheral side thereof, and further wherein a thickness of the convex curved surface portions is thinner than a thickness of the open leg portions.

9. The run-flat support body according to claim 6, wherein a thickness of the annular shell is made substantially even; and the porosity of the porous structural material is large in a portion of a convex curved surface on the outer periphery side, and small in the both leg portions on the inner periphery side.

10. A tire/wheel assembly comprising:
    a wheel including a rim;
    a pneumatic tire mounted on said rim; and
    a run-flat support body positioned within said pneumatic tire,
    wherein said run-flat support body includes:

an annular shell having an outer peripheral side as a support surface and an inner peripheral side formed in fork-shaped open legs; and elastic rings attached respectively to the open leg portions of the annular shell, with the elastic rings being mounted on said rim of said wheel, wherein the annular shell is formed of a porous structural material having fine voids, and further wherein the annular shell comprises a laminated structure that includes a plurality of the porous structural materials of which porosities are different from one another.

11. A tire/wheel assembly comprising:

a wheel including a rim;

a pneumatic tire mounted on said rim; and a run-flat support body positioned within said pneumatic tire, wherein said run-flat support body includes;

an annular shell having an outer peripheral side as a support surface and an inner peripheral side formed in fork-shaped open legs; and elastic rings attached respectively to the open leg portions of the annular shell, with the elastic rings being mounted on said rim of said wheel, wherein the annular shell is formed of a porous structural material having fine voids, and wherein the porous structural material is a sintered material made of a metal, a metal oxide, or an inorganic compound.

* * * * *